United States Patent
Takada

(10) Patent No.: US 6,594,141 B2
(45) Date of Patent: Jul. 15, 2003

(54) SOLID ELECTROLYTIC CAPACITOR AND METHOD FOR PREPARING THE SAME

(75) Inventor: Daisuke Takada, Toyama (JP)

(73) Assignee: NEC Tokin Toyama, Ltd., Toyama (JP)

(*) Notice: Subject to any disclaimer, the term of this patent is extended or adjusted under 35 U.S.C. 154(b) by 0 days.

(21) Appl. No.: 10/271,543

(22) Filed: Oct. 17, 2002

(65) Prior Publication Data

US 2003/0081374 A1 May 1, 2003

(30) Foreign Application Priority Data

Oct. 19, 2001 (JP) ........................ 2001-322738
Sep. 13, 2002 (JP) ........................ 2002-268601

(51) Int. Cl.$^7$ ................................. H01G 9/00
(52) U.S. Cl. ................. 361/523; 361/525; 361/528
(58) Field of Search ................. 361/523, 524, 361/525, 526, 528; 29/25.03

(56) References Cited

U.S. PATENT DOCUMENTS

| | | | | |
|---|---|---|---|---|
| 3,732,470 A | * | 5/1973 | Robinson | 361/523 |
| 6,114,068 A | * | 9/2000 | Yamada et al. | 429/300 |
| 6,324,051 B1 | * | 11/2001 | Igaki et al. | 361/523 |
| 6,391,379 B1 | | 5/2002 | Lessner et al. | |

FOREIGN PATENT DOCUMENTS

| | | |
|---|---|---|
| JP | 61-002204 | 1/1986 |
| JP | 61-004739 | 1/1986 |
| JP | 11-297574 | 10/1999 |
| JP | 2000-216061 | 8/2000 |
| JP | 2000-331885 | 11/2000 |
| JP | 2000-340641 | 12/2000 |
| JP | 2001-160318 | 6/2001 |
| JP | 2001-250743 | 9/2001 |

* cited by examiner

Primary Examiner—Anthony Dinkins
(74) Attorney, Agent, or Firm—Sughrue Mion, PLLC

(57) ABSTRACT

A solid electrolytic capacitor is disclosed whose semiconductor layer has improved mechanical strength and which has LC characteristics stable at a low level, and a method for preparing the same is also disclosed. The solid electrolytic capacitor comprises: an anode body with an element lead wire partially inserted therein, said anode body made of a sintered valve metal and having a large number of voids; a dielectric layer formed over the surface of the anode body; a semiconductor layer including a porous phase so formed as to cover the dielectric layer and extend into the voids and an electrically conductive polymer so formed as to fill a plurality of through-holes of the porous phase with the electrically conductive polymer; a cathode body formed on the surface of the semiconductor layer.

16 Claims, 5 Drawing Sheets

- 11a. Element lead wire
- 53. Electrically conductive adhesive
- 11. Anode body
- 1. Solid electrolytic capacitor
- 51. Molded resin
- 52. Lead frame
- 10. Capactor element
- 52.
- 12. Dielectric layer
- 15. Silver (Ag) paste layer
- 14. Cathode body
- 13. Semiconductor layer (Electrically conductive polymer and Porous phase)

11a. Element lead wire
53. Electrically conductive adhesive
11. Anode body
1. Solid electrolytic capacitor
51. Molded resin
52. Lead frame
10. Capactor element
52
12. Dielectric layer
15. Silver (Ag) paste layer
14. Cathode body
13. Semiconductor layer (Electrically conductive polymer as Electrolyte Layer)

SOLID ELECTROLYTIC CAPACITOR AND METHOD FOR PREPARING THE SAME

BACKGROUND OF THE INVENTION

1. Field of the Invention

The present invention relates to a solid electrolytic capacitor and a method for preparing the same.

2. Description of the Prior Art

Heretofore, a solid electrolytic capacitor comprises an anode, a dielectric, a semiconductor layer (solid electrolyte layer), and a cathode.

Generally, a solid electrolytic capacitor has a structure comprising an anode made of a metal exhibiting valve action (valve metal), an oxidized layer as a dielectric layer formed over the surface of the anode, a semiconductor layer (solid electrolyte layer) formed on the dielectric layer, and a cathode formed on the semiconductor layer.

In this connection, the valve metal means a metal capable of forming an oxidized layer whose thickness can be controlled by anodic oxidation. Specifically, valve metal includes niobium (Nb), aluminum (Al), tantalum (Ta), titanium (Ti), hafnium (Hf) and zirconium (Zr). Actually, however, aluminum and tantalum are mainly used.

In the following, a structure and a preparation method of a conventional tantalum (Ta) solid electrolytic capacitor will be described with reference to the drawings.

FIG. 4 is a sectional view showing a structure of a conventional tantalum (Ta) solid electrolytic capacitor.

As shown in FIG. 4, the solid electrolytic capacitor 1 using tantalum (Ta) comprises an anode body 11 which is provided with an element lead wire 11a partially inserted therein and which is formed by sintering a tantalum (Ta)-based mixed powder, a dielectric layer 12 formed over the surface of the anode body 11, an electrically conductive polymer layer 131 as a semiconductor layer 13 which is formed on the surface of the dielectric layer 12, a graphite paste layer 141 as a cathode body which is formed on the semiconductor layer 13, and a silver (Ag) paste layer 15 formed on the cathode body 14.

To the element lead wire 11a of the anode body 11 and the silver (Ag) paste layer 15, lead frames 52 are connected, respectively. The resultant is sheathed with a resin by molding with end portions of the lead frames out.

In the next place, a method for preparing a conventional tantalum (Ta) solid electrolytic capacitor will be described with reference to FIG. 5.

FIG. 5 is a flow chart showing a method for preparing a conventional solid electrolytic capacitor.

(1) Formation of Tantalum (Ta) Porous Body (S 1)
i) Preparation of Tantalum (Ta)-based Powder To improve press-moldability, a binder is added to a tantalum (Ta) powder, and the addition is followed by mixing.

ii) Press Molding and Sintering

An element lead wire of an anode is partially inserted in the tantalum (Ta)-based powder, and the resultant was press-molded into a cylindrical or parallelepipedonal shape.

Then, the press-molded product is sintered by heating at a temperature of 1,300° C. to 2,000° C. under high vacuum (10.sup.−4Pa or higher vacuum) to form a tantalum (Ta) porous body, i.e., an anode body.

(2) Formation of Dielectric Layer (S 2)

Chemical Conversion Treatment (S 2a)

The tantalum (Ta) porous body as an anode was soaked in an electrolytic aqueous solution such as a phosphoric acid aqueous solution together with a counter electrode, and a chemical conversion voltage (formation voltage) is applied to thereby form an oxidized tantalum (Ta) layer as a dielectric layer over the surface of the tantalum (Ta) porous body. (anodic oxidation method)

The thickness of the dielectric layer (oxidized tantalum (Ta) layer) is dependent upon the condition of the chemical conversion voltage (Vf: formation voltage), and characteristics as a capacitor are in turn dependent upon the thickness of the oxidized tantalum (Ta) layer. As the electrolytic solution, there may be used an aqueous solution of phosphoric acid of which concentration is adjusted to 0.6%, or the like.

(3) Formation of Semiconductor Layer (Electrolyte Layer) (S 3)

On the oxidized layer formed over the tantalum (Ta) porous body in the preceding step, a solid electrolyte layer is formed as a semiconductor layer.

As the solid electrolyte, there may be used manganese dioxide, or an electrically conductive polymer obtained by polymerizing a monomeric material such as pyrrole, thiophene or a derivative thereof.

For example, when a pyrrole polymer is used as the solid electrolyte, a solid electrolyte layer is formed on the dielectric layer formed over the surface of the anode body by effecting chemical polymerization or electrolytic polymerization using a pyrrole monomer solution and a solution of an oxidizing agent such as iron trichloride, as disclosed in Japanese Unexamined Patent Publication No.2001-160318A by Fukunaga et al.

For forming the electrically conductive polymer, a process may be employed which comprises preliminarily applying an oxidizing agent to the surface of the dielectric layer, and then soaking the resultant in a monomer solution to effect polymerization reaction, as disclosed in Japanese Unexamined Patent Publication No.2000-216061A by the present inventor.

When manganese is used as the solid electrolyte, the anode body with the dielectric layer formed over the surface thereof is soaked in manganese nitrate and heat-treated. The soaking, the heat-treatment and the like are sequentially conducted to thereby form a solid electrolyte layer.

(4) Re-Treatment for Chemical Conversion (S 4)

In the step of forming the semiconductor layer (solid electrolyte layer), the dielectric layer is likely to be damaged by the heat-treatment conducted in the step. It is particular when manganese is selected as a material of the semiconductor layer (solid electrolyte layer). To mend the damaged portions of the dielectric layer, the anode body with the sequentially formed dielectric and semiconductor (solid electrolyte) layers is soaked in the liquid for chemical conversion.

(5) Formation of Cathode Body (S 5)

Formation of Graphite Paste Layer (S 5a), and
Formation of Silver (Ag) paste layer (S 6)

A graphite layer as a cathode layer is formed on the semiconductor layer (solid electrolyte layer), and a silver (Ag) paste layer is formed thereon. With respect to the formation of the graphite layer, a method disclosed in Japanese Unexamined Patent Publication No.1999-297574 by the present inventor may be employed.

(6) Connection of Lead Frames (S 7), and
Sheathing by Molding (S 8)

Then, a lead frame for the anode is connected to the element lead wire of the anode body by spot welding, and a lead frame for the cathode is connected to the silver paste layer with an electrically conductive adhesive.

Finally, the resulting capacitor element is sheathed with a resin by molding with end portions of the lead frames out to complete a tantalum (Ta) solid electrolytic capacitor having a structure as shown in FIG. 4.

However, the tantalum (Ta) solid electrolytic capacitor prepared through the above-described steps has the following problems.

In the step of soaking the anode body, which has been soaked in the liquid for chemical conversion and is thereby provided with the dielectric layer formed over the surface thereof, in the oxidizing agent-containing solution, and air-drying the resultant, the oxidizing agent-containing solution tends to gather around the edges of the anode body with the dielectric layer formed over the surface thereof because of its surface tension. As a result, the semiconductor layer, i.e., solid electrolyte layer which is formed on the dielectric layer is likely to have a non-uniform thickness.

If the semiconductor layer (solid electrolyte layer) has non-uniformity in thickness, the semiconductor layer is liable to be damaged by heat-treatment conducted in the step of sheathing with a resin to cause separation between the layers and/or cracking of the layer.

Further, there is an undesired possibility that if the semiconductor (solid electrolyte layer) is damaged, the dielectric layer is damaged due to the damage of the semiconductor layer. This causes a drawback that leakage current (hereinafter referred to as LC) is increased by influence of heat in the step of sheathing by molding in the preparation of the capacitor, at a stage of soldering for putting the capacitor into actual use, and at a stage of actual use of the capacitor. It may be said that a capacitor of higher quality has a lower LC.

Moreover, as important characteristics of a solid electrolytic capacitor, there may be mentioned an equivalent series resistance (hereinafter referred to as ESR). ESR should be controlled at a low level as in the case of LC.

It may be mentioned as a cause of increase of ESR that the dielectric layer is not sufficiently covered with the electrically conductive polymer, and that the electrically conductive polymer layer is faultily formed. In such cases, undesirability in capacitor characteristics such as lowering in capacity and increase of dielectric loss are caused. It is, therefore, an important challenge to sufficiently cover the dielectric layer with the electrically conductive polymer.

SUMMARY OF THE INVENTION

It is the primary object of the present invention to provide a novel solid electrolytic capacitor which shows low LCs and also low ESR, and a method for preparing the same.

It is another object of the present invention to provide a solid electrolytic capacitor whose semiconductor layer as a solid electrolyte layer has a uniform thickness, a method for preparing the same.

It is a still another object of the present invention to provide a solid electrolytic capacitor whose semiconductor layer as a solid electrolyte layer has high mechanical strength, and a method for preparing the same.

It is a further object of the present invention to provide a solid electrolytic capacitor whose semiconductor layer (solid electrolyte layer) is less susceptible to damage by heat treatments in the course of preparation procedure and which is less likely to undergo occurrence of separation of layers from each other or cracking, and a method for preparing the same.

It is a still further object of the present invention to provide a solid electrolytic capacitor whose semiconductor layer (solid electrolyte layer) formed on a dielectric layer sufficiently cover the dielectric layer, and a method for preparing the same.

According to an embodiment of the present invention, the embodiment comprises a semiconductor layer including a porous phase so formed as to cover a dielectric layer and extend into voids formed during formation of an anode body and an electrically conductive polymer so formed as to fill a plurality of through-holes of the porous phase.

By virtue of the construction, the electrically conductive polymer is formed in such a manner that the pores of the porous phase are filled therewith, and the semiconductor layer, i.e., solid electrolyte layer thereby has a uniform thickness. Further, anchor effect is obtained by the penetration of the electrically conductive polymer throughout the porous phase, and the electrically conductive polymer which exhibits function as the semiconductor layer becomes less susceptible to separation from the dielectric layer and/or the cathode body. In consequence, strong bonds between the semiconductor layer and the dielectric layer and between the semiconductor layer and the cathode body are realized which are highly resistant to the thermal stress during formation of a resin sheath. This leads to increased mechanical strength of the solid electrolyte layer.

According to still another embodiment of the present invention, the embodiment comprises: a step of applying a liquid containing a substance for forming a porous phase of a semiconductor layer onto the surface of the dielectric layer, followed by drying the resultant to form the porous phase having through-holes; and a step of forming an electrically conductive polymer of the semiconductor layer in such a manner that the through-holes of the porous phase is filled with the electrically conductive polymer By employing such a method, the porous phase serves as a skeleton for the electrically conductive polymer, and the electrically conductive polymer is stably formed substantially independently of the condition of the polymerization, and the formed semiconductor layer has a uniform thickness and high mechanical strength. In consequence, no substantial weak portions of the semiconductor layer which have low mechanical strengths are formed.

BRIEF DESCRIPTION OF THE DRAWINGS

The above-mentioned objects and other objects, embodiments and effects of the present invention will be more apparent by the following description with reference to the drawings.

DETAILED DESCRIPTION OF THE PREFERRED EMBODIMENTS

In the following, an embodiment of the solid electrolytic capacitor according to the present invention and an embodiment of the mathod for preparing the same will be described with reference to the drawings.

Figure 1:
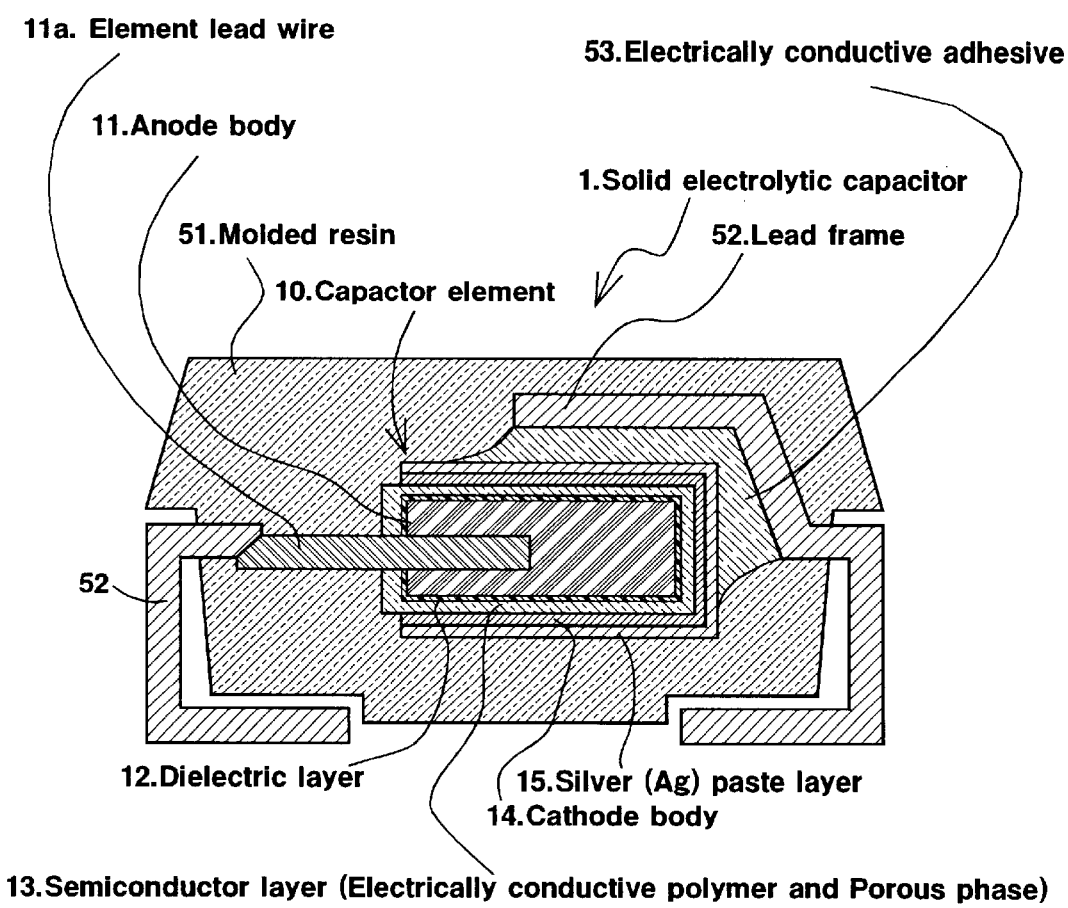
FIG. 1 is a sectional view schematically showing a structure of an embodiment of the solid electrolytic capacitor according to the present invention.

FIG. 1 is a sectional view showing a structure of an embodiment of the solid electrolytic capacitor according to the present invention.

As shown in FIG. 1, the embodiment of the solid electrolytic capacitor 1 according to the present invention comprises a capacitor element 10, lead frames 52 to which an anode section and a cathode section of the capacitor element are directly and indirectly connected, respectively, and a molded resin 51 which seals at least the capacitor element 10.

The capacitor element 10 as a constituent of the solid electrolytic capacitor 1 comprises an element lead wire 11a made of tantalum (Ta), an anode body 11 with the element lead wire 11a partially inserted therein which anode body is formed by sintering a mixed powder containing mainly tantalum (Ta), a dielectric layer 12 formed over the surface of the anode body 11, a semiconductor layer 13 formed on the surface of the dielectric layer 12 and including an electrically conductive polymer 131 and a porous phase 132, a cathode body 14 consisting of a graphite paste layer 141 so formed as to surround the semiconductor layer 13, and an silver (Ag) paste layer 15 formed on the cathode body 14.

The above-mentioned anode section means the element lead wire 11a partially inserted in the anode body 11 when the anode body is formed. On the surface of the element lead wire 11a, the dielectric layer 12 is not formed so as to permit conduction between the element lead wire and the lead frame 52 to which the element lead wire is connected. The dielectric layer 12 may be formed on part of the surface of the anode body 11 due to the similar reason above, although in this embodiment the dielectric layer 12 is formed over the surface of the anode body 11 to increase the area that have a function of a capacitor.

The above-mentioned cathode section means the outer-most layer to which the lead frame 52 is connected and which is in electrical conduction with the cathode body 14 of the capacitor element 10. Although the cathode body 14 is so formed as to surround the semiconductor layer 13 in this embodiment, the cathode body 14 may be formed to cover part of the surface of the semiconductor layer 13 if desired. The silver (Ag) paste layer 15 normally corresponds to the cathode section.

The lead frames 52 area of opening anode terminal and a cathode terminal which are connected to the element lead wire 11a as the anode section and the silver (Ag) paste layer 15 as the cathode section, respectively.

In this embodiment, the lead frame 52 as the cathode terminal and the silver (Ag) paste layer 15 are connected via an electrically conductive adhesive 53.

Subsequently, the structure of the embodiment of the solid electrolytic capacitor according to the present invention and, in particular, the structure of the above-described capacitor element will be described below with reference to FIG. 2.

Figure 2:
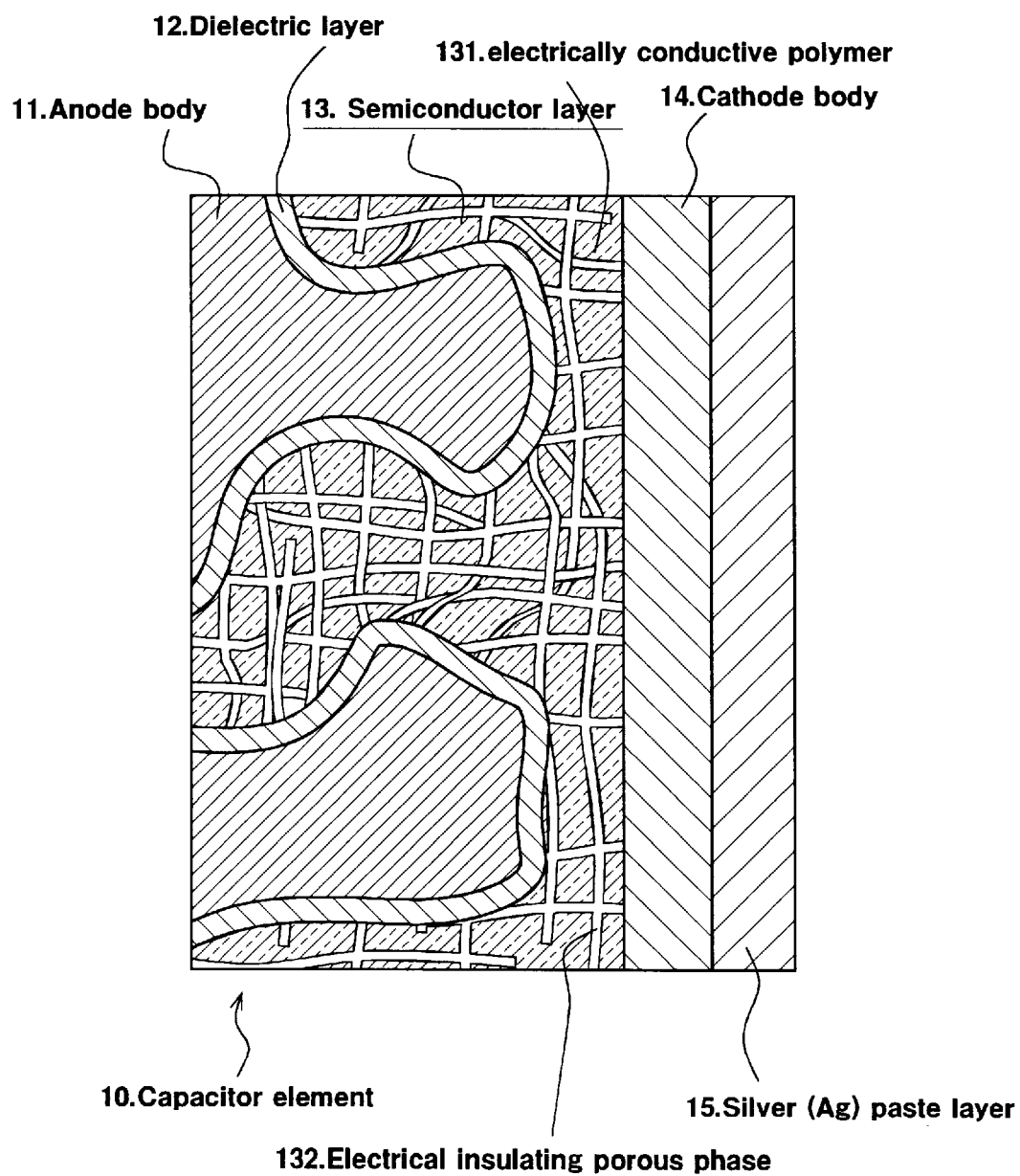
FIG. 2 is a sectional view schematically showing a structure of a capacitor element of the solid electrolytic capacitor according to the present invention.

FIG. 2 is a sectional view schematically showing the structure of the capacitor element of the solid electrolytic capacitor according to the present invention.

As shown in FIG. 2, the capacitor element 10 of the solid electrolytic capacitor according to the present invention comprises an anode body 11 made of a sintered product having a large number of voids, a dielectric layer 12 formed over the surface of the anode body 11, a semiconductor layer 13 formed on the surface of the dielectric layer 12, a cathode body 14 (graphite paste layer 141) so formed as to surround the semiconductor layer 13, and an Silver (Ag) paste layer 15 formed on the cathode layer 14.

The void portions mean the voids formed when the valve metal is sintered into the anode body 11.

The semiconductor layer 13 comprises an electrically conductive polymer 131 and an electrical insulating porous phase 132 and is formed on the surface of the dielectric layer 12 and to extend into the void portions. In this embodiment, the porous phase 132 is so formed as to cover the surface of the dielectric layer 12, however, the porous phase 132 may be formed on part of the surface of the dielectric layer 12 if desired.

The electrically conductive polymer 131 may be a conventionally used electrolyte, for example, a polypyrrole. In the solid electrolytic capacitor according to the present invention, as opposed to a conventional semiconductor layer 13 (electrolyte layer) constituted only of an electrically conductive polymer, the semiconductor layer 13 is formed in such a manner that the pores of the electric insulating porous phase 132 are filled with the electrically conductive polymer 131 instead of such a conventional semiconductor layer (electrolyte layer).

In other words, the porous phase 132 is so formed as to be a skeleton of the electrically conductive polymer 131 as a main constituent of the semiconductor layer 13.

The area of opening of the electrically conductive polymer 131 and the porous phase 132 are formed is not restricted to the periphery of the dielectric layer 12 but extends into the void portions.

As shown in FIG. 2, the porous phase has an irregular morphology. In (the embodiment of) the solid electrolytic capacitor according to the present invention, the porous phase 132 may be formed within such an degree that at least electrical conductivity of the electrically conductive polymer 131 is not affected.

Specifically, the porous phase 132 may be in an irregular fibrous form.

However, the porous phase 132 should be formed within such an degree that conduction between the outer surface of the semiconductor layer 13 and the semiconductor layer 13-dielectric layer 12 interface is not affected.

It is preferred that the porous phase 132 have an area of opening or area of openings where constituents are bonded with each other by cross-linking, i.e., chemical bond. This is because mechanical strength of the porous phase 132 is increased and, accordingly, the semiconductor layer becomes highly resistant to external thermal stress in an exterior work or the like.

By virtue of the construction, the electrically conductive polymer is formed in such a manner that the pores of the porous phase are filled therewith, and the semiconductor layer, i.e., solid electrolyte layer thereby has a uniform thickness. Further, anchor effect is obtained by the penetration of the electrically conductive polymer throughout the porous phase, and the electrically conductive polymer which exhibits function as the semiconductor layer becomes less susceptible to separation from the dielectric layer and/or the cathode body. In consequence, strong bonds between the semiconductor layer and the dielectric layer and between the semiconductor layer and the cathode body are realized which are highly resistant to the thermal stress during formation of a resin sheath.

Further, since the electrically conductive polymer 131 is formed in such a manner that the pores of the electric insulating porous phase 132 are filled therewith, the semiconductor layer (solid electrolyte layer) thereby has a uniform thickness. In consequence, leakage currents are suppressed, and the semiconductor layer becomes highly resistant to external thermal stress in an exterior work or the like.

It is preferred that bond by cross-linking be included in at least any one of bond between the constituents of the porous phase 132, bond between the electrically conductive polymer 131 and the porous phase 132, and bond between the dielectric layer 12 and the semiconductor layer 13. By providing the bond by cross-linking, peel strengths between the bonded surfaces are increased, and the solid electrolytic capacitor becomes less susceptible to increase of ESR due to thermal stress or the like.

Further, it is preferred that porosity of the porous phase, i.e., ratio of total volume of the pores of the porous phase to apparent volume of the porous phase be in a range of about 58% to about 95% and that the pores have an average area of opening of about 0.008 $\mu m^2$ to about 0.008 $mm^2$, which is in a range of about 50 nm to about 50 $\mu m$ when the unit is converted into an average pore diameter from an average area of opening thereof. By virtue of such a structure of the porous phase, the electrically conductive polymer is efficiently formed in the pores of the porous phase without clogging. Accordingly, the solid electrolytic capacitor is less susceptible to increase of ESR.

In contrast thereto, if the porosity is lower than about 58% or the average area of opening of the pores is smaller than about 0.008 $\mu m^2$, portions of the pores of the porous phase are likely to result where the electrically conductive polymer is not formed therein, consequently preventing the electrically conductive polymer from sufficiently cover the dielectric layer. This causes increase of an initial value of ESR. It is experientially known that a capacitor having a high initial value of ESR shows a high increasing rate of ESR in the subsequent use environment. Accordingly, by controlling the initial value to a low level, a highly reliable solid electrolytic capacitor is obtained. On the other hand, if the porosity is higher than about 95% or the average area of opening of the pores is larger than about 0.008 $mm^2$, sufficient mechanical strength of the porous phase is not ensured. Accordingly, the semiconductor layer is likely to be damaged by thermal stress during providing a resin sheath.

Furthermore, it is preferred that the semiconductor layer have a thickness in a range of about 10.mu.m to about 1 mm. By virtue of this, there is reduced an undesirable possibility that the semiconductor layer and the adjoining layers are cracked or separated from each other due to thermal stress during providing a resin sheath. Consequently, increase of LCs is prevented. If the semiconductor layer has a thickness smaller than the range, the semiconductor layer is likely to be damaged by influence of thermal stress during providing a resin sheath. If the semiconductor layer has a thickness exceeding the range, mechanical strength of the semiconductor layer is adversely lowered thermal stress which the porous phase undergoes in the drying step for forming the porous phase.

In next place, an embodiment of the method for preparing the solid electrolytic capacitor according to the present invention will be described below with reference to the drawings.

In the description with respect to the embodiment of the method for preparing the solid electrolytic capacitor according to the present invention, each of concentrations of solutions or dispersions which is expressed in percentage means % by volume.

Figure 3:
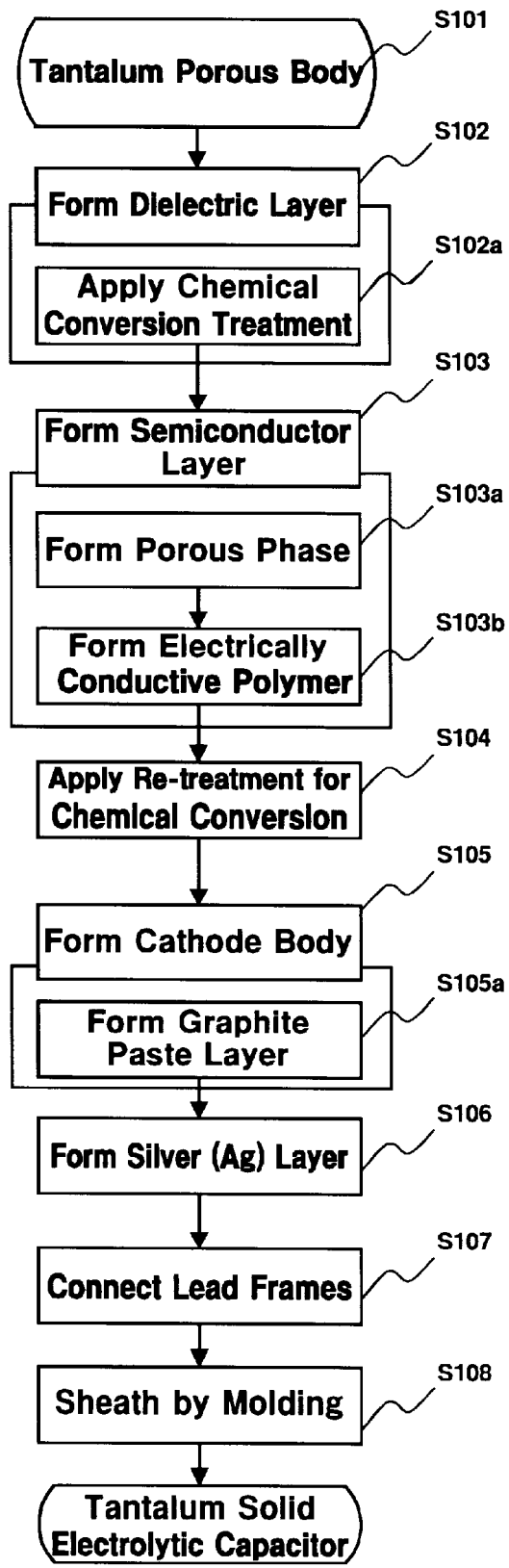
FIG. 3 is a flow chart showing an embodiment of a method for preparing the solid electrolytic capacitor according to the present invention.
Figure 4:
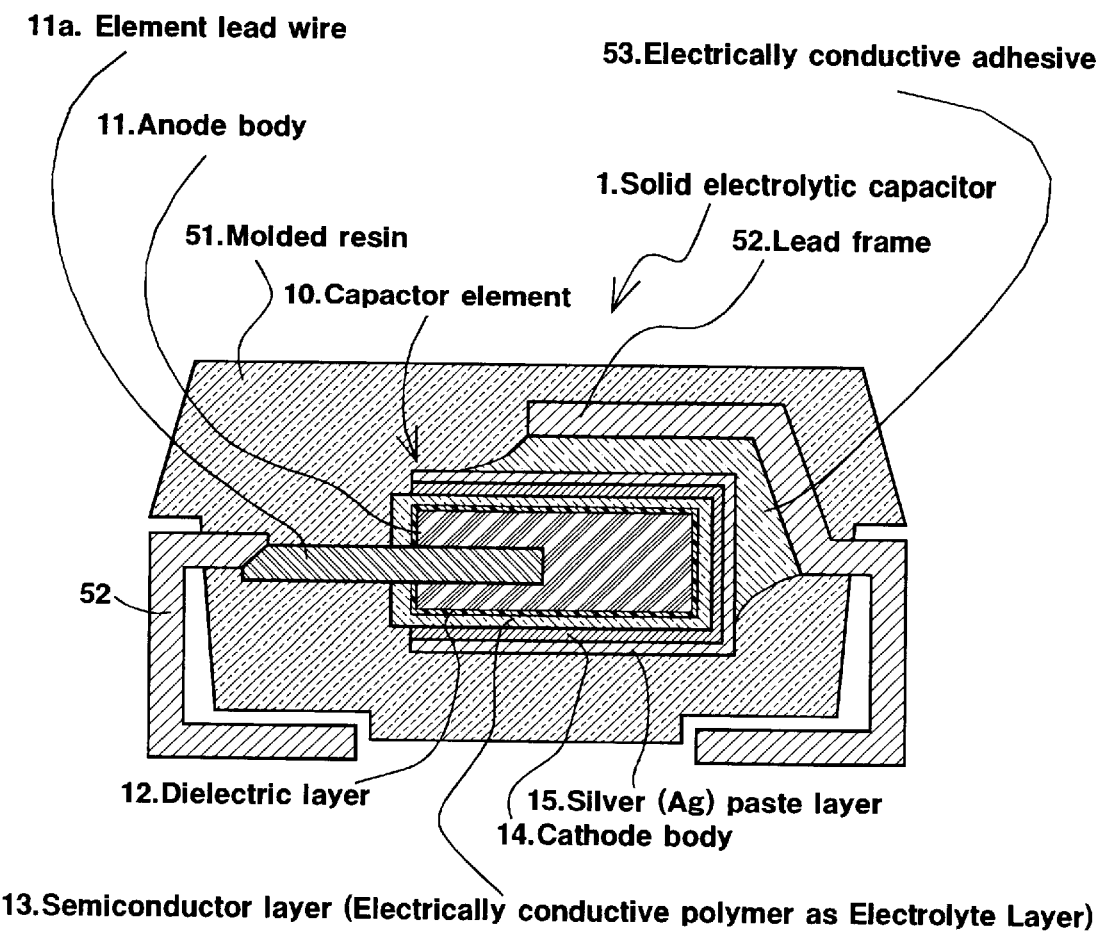
FIG. 4 is a sectional view showing a structure of a conventional solid electrolytic capacitor.
Figure 5:
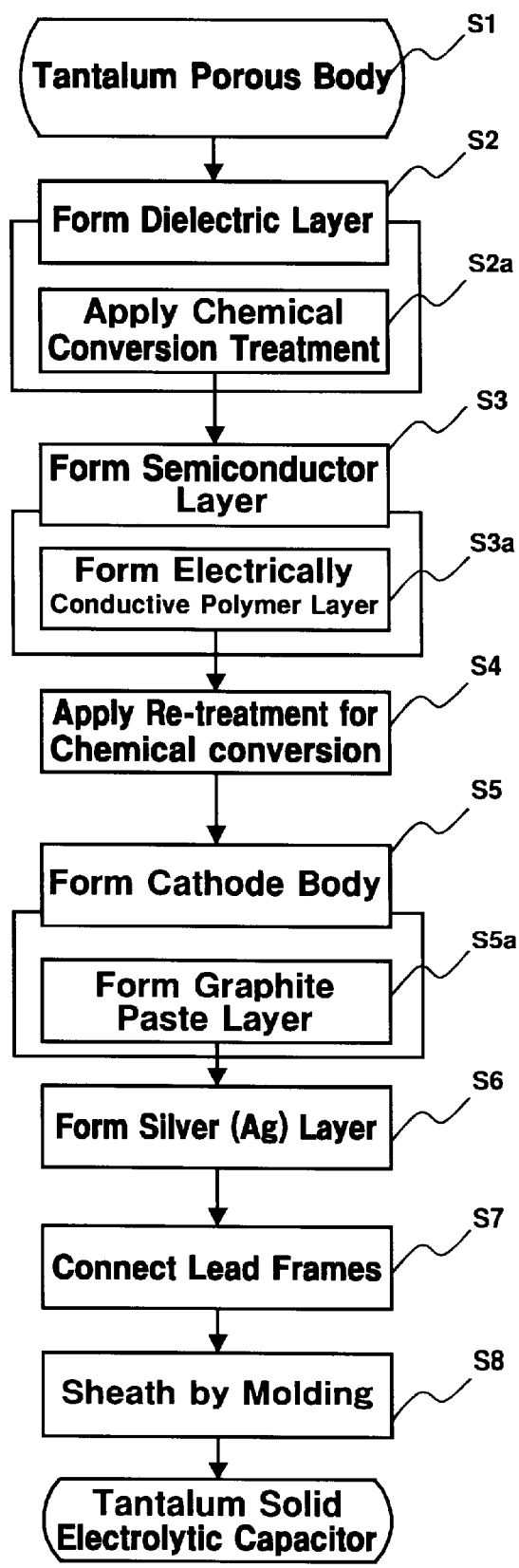
FIG. 5 is a flow chart showing a method for preparing a conventional solid electrolytic capacitor.

FIG. 3 is a flow chart showing the embodiment of the method for preparing the solid electrolytic capacitor according to the present invention.

As shown in FIG. 3, (1) Formation of Tantalum (Ta) Porous Body (Anode Body) (S 101)

i) Preparation of Tantalum-based Powder

To improve press-moldability, a binder is added to a tantalum (Ta) powder, and the addition is followed by mixing.

ii) Press Molding and Sintering

An element lead wire of an anode is partially inserted in the tantalum (Ta)-based powder, and the resultant was press-molded into a cylindrical or parallelepipedonal shape.

Then, the press-molded product is sintered by heating at a temperature of 1,400.degree.C. to 2,000.degree.C. under high vacuum ($10^{-4}$Pa or higher vacuum) to form a tantalum (Ta) porous body (anode body).

(2) Formation of Dielectric Layer (S 102)

(Chemical Conversion Treatment (S 102a))

The tantalum (Ta) porous body as an anode was soaked in an electrolytic aqueous solution such as a phosphoric acid aqueous solution together with a counter electrode, and a chemical conversion voltage (formation voltage) is applied to thereby form an oxidized tantalum (Ta) layer as a dielectric layer over the surface of the tantalum (Ta) porous body. (anodic oxidation method) In this embodiment, the tantalum (Ta) porous body with the exception of a part of the element lead wire which was not inserted into the tantalum (Ta) powder at the previous step is soaked into the solution, however, part of the tantalum (Ta) porous body may not be soaked into the solution if desired.

The thickness of the oxidized tantalum (Ta) layer is depends upon the condition of the chemical conversion voltage (Vf: formation voltage), characteristics as a capacitor are depend upon the thickness of the oxidized tantalum (Ta) layer. As the electrolytic solution, there may be used an aqueous solution of phosphoric acid of which concentration is adjusted to 0.6%, or the like.

(3) Formation of Semiconductor Layer (S 103)

The semiconductor layer according to the present invention comprises a porous phase and an electrically conductive polymer.

Formation of Porous Phase (S 103a)

A dispersion prepared by dispersing a substance for forming the porous phase in a dispersion medium in the presence of a surfactant is applied onto the dielectric layer 12 formed over the surface of the anode body 11. In this embodiment, the dispersion is applied onto the surface of the dielectric layer 12 so as to increase the area of the dielectric layer 12 on which the porous phase is formed. However, the dispersion may be applied onto part of the surface of the dielectric layer 12 if desired. Soaking is employed to apply the dispersion onto the dielectric layer 12 in this embodiment because it is one of the most convenient methods, however, distributing, spreading, brushing or coating may be employed instead of soaking.

After this step, the resultant, which comprises the dispersion and the anode body 11 with the dielectric layer 12, is dried. Since the drying is a step for forming the pores of the porous phase which hold the electrically conductive polymer by vaporizing the dispersion medium, the drying is carried out preferably at a temperature as high as possible so long as it is allowable in terms of material characteristics.

As the substance for forming the porous phase, one which is readily dispersible in a dispersion medium such as water is preferably used. Specifically, a polytertafluoroethylene (PTFE), silica, cellulose or the like may be mentioned. There is no particular restriction with respect to the form of the substance, and the substance may be in the form of particles, fibers or the like.

In this embodiment, the dispersion is used. As disclosed in Japanese Unexamined Patent Publication No.2001-160318A, however, there may be used as the porous phase a porous polyamide which is obtained by applying a solution prepared by dissolving a polyamide in an alcoholic solvent, followed by drying.

It is preferred that a step of forming a thin layer containing a cross-linking substance on the surfaces of the dielectric layer 12 and the porous phase 132 be carried out prior to carrying out the following step of forming an electrically conductive polymer phase.

Afterward, cross-linking reaction is effected by heating or other methods so that at least any one of bond between the constituents of the porous phase 132, bond between the electrically conductive polymer 131 and the porous phase 132, and bond between the dielectric layer 12 and the semiconductor layer 13 includes bond by cross-linking. By virtue of this, peel strength of the bonded surfaces is increased, and the solid electrolytic capacitor becomes less susceptible to increase of ESR due to thermal stress or the like.

As the cross-linking substance, there may be mentioned a silane coupling agent, an epoxy material or the like. There is no particular restriction with respect to functional groups which are bonded to silicon atoms of the silane coupling agent. Preferred are, however, an alkoxy group such as a methoxy group, an ethoxy group or the like; and an alkoxy group having its at least one hydrogen atom substituted by a halogen atom.

When a silane coupling agent is used as a cross-linking agent, it is particularly preferred that the porous phase 132 contain an inorganic oxide. The silane coupling agent is cross-linked to the electrically conductive polymer 131 and the porous phase 132 and the dielectric layer 12, and the semiconductor layer 13 having particularly high mechanical strength is thereby obtained.

Formation of Electrically Conductive Polymer Phase (S 103b)

For formation of an electrolyte layer (electrolyte phase) which is an important member that functions as the semiconductor layer in the present invention, an electrically conductive polymer is used.

As the electrically conductive polymer, there may be used an electrically conductive polymer obtained by polymerizing a monomeric material such as pyrrole, thiophene, aniline, furan, or a derivative thereof.

Formation of the electrolyte layer (electrolyte phase) is effected by carrying out chemical oxidative polymerization after the formation of the porous phase. Specifically, the product resulting from the formation of the porous phase is soaked in a solution, which is prepared by dissolvng an oxidizing agent such as ferric benzenesulfonate, ferric toluenesulfonate, ferric naphthalenesulfonate or iron trichloride in a mixed solvent of water and an alcohol such as ethyl alcohol, methyl alcohol, propyl alcohol or the like, and dried and then soaked in a solution of the monomric material for forming the electrically conductive polymer.

Further, formation of the electrolyte layer subsequent to the formation of the porous phase may be carried out using a polymer such as a polyaniline, as disclosed in Example 2 of U.S. Pat. No. 6,391,379 by Lessner et al.

The electrolyte layer (electrolyte phase) is so formed as to fill the pores of the porous phase therewith.

It is preferred that the thickness of the semiconductor layer comprising the porous phase and the electrically conductive polymer be about 10.mu.m or more with a view to preventing increase of leakage currents (LCs) due to thermal stress in a step of forming a resin sheath which is afterward carried out.

However, if the thickness exceeds about 1 mm, mechanical strength of the semiconductor layer is adversely lowered due to thermal stress which the porous phase undergoes in the step of drying for forming the porous phase.

By employing such a formation process, the electrically conductive polymer is formed in such a manner that the pores of the porous phase are filled therewith, and the semiconductor layer, i.e., solid electrolyte layer thereby has a uniform thickness. Further, anchor effect is obtained by the penetration of the electrically conductive polymer throughout the porous phase, and the electrically conductive polymer which exhibits function as the semiconductor layer becomes less susceptible to separation from the dielectric layer and/or the cathode body. In consequence, strong bonds between the semiconductor layer and the dielectric layer and between the semiconductor layer and the cathode body are obtained which are highly resistant to the thermal stress during formation of a resin sheath.

Further, since the electrically conductive polymer 131 is formed in such a manner that the pores of the electric insulating porous phase 132 are filled therewith, the semiconductor layer (solid electrolyte layer) thereby has a uniform thickness. In consequence, leakage currents are suppressed, and the semiconductor layer becomes highly resistant to external thermal stress in an exterior work or the like.

Further, it is preferred that porosity of the porous phase, i.e., ratio of total volume of the pores of the porous phase to apparent volume of the porous phase is in a range of about 58% to about 95% and the pores have an average area of opening of about 0.008 $\mu m^2$ to about 0.008 $mm^2$. By virtue of such a structure of the porous phase, the electrically conductive polymer is efficiently formed in the pores of the porous phase without clogging. Accordingly, the solid electrolytic capacitor has low ESR.

If the porosity is lower than about 58% or the average area of opening of the pores is smaller than about 0.008 $\mu m^2$, portions of the pores of the porous phase are likely to result where the electrically conductive polymer is not formed therein, consequently preventing the electrically conductive polymer from sufficiently cover the dielectric layer. This causes increase of an initial value of ESR. It is experientially known that a capacitor having a high initial value of ESR shows a high increasing rate of ESR in the subsequent use environment. Accordingly, by controlling the initial value to a low level, a highly reliable solid electrolytic capacitor is obtained. On the other hand, if the porosity is higher than about 95% or the average area of opening of the pores is larger than about 0.008 mm², sufficient mechanical strength of the porous phase is not ensured. Accordingly, the semiconductor layer is likely to be damaged by influence of thermal stress during providing a resin sheath.

Furthermore, it is preferred that the semiconductor layer has a thickness in a range of about 10.mu.m to about 1 mm. By virtue of this, there is reduced an undesirable possibility that the semiconductor layer and the adjoining layers are cracked or separated from each other due to thermal stress during providing a resin sheath. Consequently, increase of LCs is prevented. If the semiconductor layer has a thickness smaller than the range, the semiconductor layer is likely to be damaged by influence of thermal stress during providing a resin sheath. If the semiconductor layer has a thickness exceeding the range, mechanical strength of the semiconductor layer is adversely lowered by thermal stress which the porous phase undergoes in the drying step for forming the porous phase.

In another preferable mode of the above-described formation process, the solution or dispersion in which the anode body with the dielectric layer formed over the surface thereof is soaked has a concentration of the substance for forming the porous phase of about 10% by volume to about 20% by volume based on the volume of the solution or dispersion. If the concentration is lower than about 10% by volume, formation of the porous phase is insufficient. In consequence, the resulting solid electrolytic capacitor is insufficient in resistance to thermal stress in the step of forming a resin sheath, and increase of LCs is considerable.

On the other hand, if the concentration is higher than about 20% by volume, the porous phase is excessively formed on the dielectric layer. Consequently, the electrically conductive polymer is prevented from sufficiently covering the dielectric layer. This leads to considerable increase of ESR. As described above, a solid electrolytic capacitor which shows a high ESR just after having been produced tends to show great increase of ESR afterward. It is, therefore, particularly preferred that the upper limit of the concentration of the substance for forming the porous phase be about 20% by volume.

(4) Re-Treatment for Chemical Conversion (S 104)

Subsequently, with a view to repairing, the same procedure as the above-described chemical conversion treatment (S 102a) was performed again, except that the post-S 103 product is soaked in the electrolytic solution instead of the tantalum (Ta) porous body.

(5) Formation of Cathode Body (S 105)

Formation of Graphite Layer (S 105a)

A cathode body made of graphite is so formed as to surround the semiconductor layer 13 in this embodiment. The cathode may be formed on part of the surface of the semiconductor layer 13 if desired.

(6) Formation of Silver (Ag) Paste Layer (S 106)

Thereafter, a silver (Ag) paste layer is formed on the surface of the cathode body to improve connection between the cathode body and a cathode terminal.

(7) Connection of Lead Frames (S 107)

Then, a lead frame for the anode is connected to the element lead wire of the anode body by spot welding, and a lead frame for the cathode is connected to the silver paste layer with an electrically conductive adhesive.

(8) Sheathing by Molding (S 108)

Finally, the resulting capacitor element is sheathed with a resin by molding with end portions of the lead frames out to complete a tantalum (Ta) solid electrolytic capacitor having a structure as shown in FIG. 1.

EXAMPLES

The description of the following specific Examples is given by way of illustration for more clear understanding of the present invention. In Examples, preferred embodiments of the present invention are described. It is, however, to be understood that the scope of the present invention is by no means restricted to these specific Examples.

In the followng, an embodiment of the solid electrolytic capacitor and the method for preparing the same according to the present invention will be described with reference to the drawings and a Table.

Example 1

A tantalum (Ta) powder in which an element lead wire made of tantalum is partially inserted and which has a CV value of 50 kcv/g was charged into a pelleter and pressed, the palletized product was sintered at a preferable temperature of 1,350.degree.C. selected from a generally used range of 1,300.degree.C. to 2,000.degree.C. in a vacuum atmosphere of $10.^{-4}$Pa or higher vacuum to obtain a porous anode body having a parallelepipedonal shape.

The anode body was soaked in an aqueous solution of 0.6% by volume phosphoric acid and subjected to anodic oxidation with application of a voltage of 33.7 volt for 180 minutes to thereby form a dielectric layer over the surface of the pellet.

The resulting pellet was soaked in an aqueous dispersion containing 20% by volume of a polytetrafluoroethylene (PTFE) and a small amount of a surfactant for 5 minutes.

The post-soaking pellet was placed in an oven and dried at 240.degree.C. for 30 minutes. The thus formed porous phase had a porosity of more than 58% and the pores of the porous phase had an average area of opening of about 0.008 $\mu m^2$.

The post-drying pellet was soaked in an oxidizing agent solution prepared by dissolving 400 g of ferric benzenesulfonate in 1000 g of an ethanol at room temperature for 5 minutes, and then dried.

Subsequently, the resulting pellet was soaked in an aqueous solution containing 5% by volume of pyrrole as a monomeric material for 1 minute and then air-dried at room temperature. The soaking in the oxidizing agent solution and the drying subsequent thereto, and the soaking in the monomer-containing solution and the drying subsequent thereto were repeated 4 times to thereby obtain a semiconductor layer comprising the porous phase and the resulting electrically conductive polymer. The semiconductor layer had a thickness of about 10.mu.m.

Then, anodic oxidation treatment was preformed again in the same manner as described above except that the product provided with the semiconductor layer was soaked instead of the porous anode body as such to effect repairing of the dielectric layer.

Thereafter, the resultant was soaked in a graphite paste obtained by mixing 5% by weight of a binder prepared by mixing a polymethyl methacrylate resin and an acetylcellulose at a weight ratio of 4:1, 15% by weight of a graphite powder, and 80% by weight of pure water. The soaking was repeated several times so as to apply the graphite paste in a thickness of 30.mu.m. Subsequently, the applied graphite paste was cured at a high temperature of 150.degree.C. for 30 minutes to form a graphite paste layer as a cathode body.

Then, a silver (Ag) paste layer was formed on the cathode body. A lead frame for the anode body was connected to the element lead wire of the anode body by spot welding, and a lead frame for the cathode body was connected to the silver (Ag) paste layer with an electrically conductive adhesive containing silver flakes. Finally, the resulting capacitor element was sheathed with a resin, which was epoxy resin in this example, by molding with end portions of the lead frames out to obtain a solid electrolytic capacitor.

With respect to 10 capacitors obtained in the above-described manner and having a capacity of 10 V/100.mu.F, LCs were measured at different voltages. As a result, the average values thereof were as follows.

0.1.mu.A at 1.5 V 0.5.mu.A at 2.5 V 10.mu.A at 4.0 V 30.mu.A at 6.3 V 200.mu.A at 10 V

With respect to the 10 capacitors, ESRs were also measured. As a result, the average value thereof was 37 m.orm.

In the above-described preparation procedure, 0.80% of 500 capacitors were rejected from lots for the reason that LCs thereof had increased after the step of forming a resin sheath.

With respect to acceptable products, 0% of the 500 products were impaired their functions as capacitors after subjected to heat experiment where the products were put through a reflow oven twice and kept at 260.degree.C. for 20 seconds in total Example 2

The same preparation method as in Example 1 was carried out to obtain a solid electrolytic capacitor except that the amount of PTFE in the soaking step for forming a porous phase was 10% by volume.

With respect to 10 capacitors obtained in this manner and having a capacity of 10 V/100.mu.F, LCs were measured at different voltages. As a result, the average values thereof were as follows.

0.1.mu.A at 1.5 V 0.8.mu.A at 2.5 V 23.mu.A at 4.0 V 84.mu.A at 6.3 V 350.mu.A at 10 V

With respect to the 10 capacitors, ESRs were also measured. As a result, the average value thereof was 36 m.orm.

In the above-described preparation procedure, 2.80% of 500 capacitors were rejected from lots for the reason that LCs thereof had increased after the step of forming a resin sheath.

With respect to acceptable products, 0% of the 500 products were impaired their functions as cpapacitors after subjected to heat experiment where the products were put through a reflow oven twice and kept at 260.degree.C. for 20 seconds in total Example 3

The same preparation method as in Example 1 was carried out up to the drying step for forming a porous phase to prepare of opening dried pellet.

The dried pellet was soaked in a solution prepared by adjusting a 0.5% by weight aqueous solution of an methoxy-containing silane coupling agent prepared to pH 4 with acetic acid for 15 minutes. The resulting pellet was air-dried for 45 minutes and further dried by heating at 125.degree.C. for 10 minutes to form a silane coupling agent layer on the porous phase and the dielectric layer.

The pellet provided with the silane coupling agent layer formed on the porous phase and the dielectric layer was soaked in an oxidizing agent solution prepared by dissolving 400 g of ferric benzenesulfonate in 1000 g of an ethanol at room temperature for 5 minutes, and then dried in the same manner as in Example 1. The following steps were carried out in the same manner as in Example 1 to obtain a solid electrolytic capacitor.

With respect to 10 capacitors obtained in this manner and having a capacity of 10 V/100.mu.F, ESRs were measured. As a result, the average value thereof was 35 m.orm.

In the above-described preparation procedure, 0.40% of 500 capacitors were rejected from lots for the reason that LCs thereof had increased after the step of forming a resin sheath.

With respect to acceptable products, 0% of the 500 products were impaired their functions as cpapacitors after subjected to heat experiment where the products were put through a reflow oven twice and kept at 260.degree.C. for 20 seconds in total Example 4

The same preparation method as in Example 1 was carried out up to the step of forming a dielectric layer over a surface of a pellet.

The resulting pellet was soaked in an aqueous dispersion for 5 minutes in which 20% by volume of a silica powder having an average particle diameter of 0.25 mm was dispersed.

The post-soaking pellet was placed in an oven and dried at 240.degree.C. for 30 minutes to form a porous phase. The thus obtained porous phase had a porosity of more than 58%, and the pores of the porous phase had an average area of opening of about 0.008 $\mu m^2$.

A 0.5% by weight aqueous solution of an methoxy-containing silane coupling agent was adjusted to pH 4 with acetic acid. In this solution, the dried pellet was soaked for 15 minutes. This pellet was air-dried for 45 minutes and further dried by heating at 125.degree.C. for 10 minutes to form a silane coupling agent layer on the porous phase and the dielectric layer.

The pellet provided with the silane coupling agent layer formed on the porous phase and the dielectric layer was soaked in an oxidizing agent solution prepared by dissolving 400 g of ferric benzenesulfonate in 1000 g of a ethanol at room temperature for 5 minutes, and then dried in the same manner as in Example 1. The following steps were carried out in the same manner as in Example 1 to obtain a solid electrolytic capacitor.

With respect to 10 capacitors obtained in this manner and having a capacity of 10 V/100.mu.F, ESRs were measured. As a result, the average value thereof was 34 m.orm.

In the above-described preparation procedure, 0.40% of 500 capacitors were rejected from lots for the reason that LCs thereof had increased after the step of forming a resin sheath.

With respect to acceptable products, 0% of the 500 products were impaired their functions as cpapacitors after subjected to heat experiment where the products were put through a reflow oven twice and kept at 260.degree.C. for 20 seconds in total.

Comparative Example 1

The same preparation method as in Example 1 was carried out, except that the steps for forming a porous phase was omitted, to obtain a solid electrolytic capacitor whose semiconductor layer constituted only of an electrically conductive polymer.

With respect to 10 capacitors obtained in this manner and having a capacity of 10 V/100.mu.F, LCs were measured at different voltages. As a result, the average values thereof were as follows.

40.mu.A at 1.5 V 100.mu.A at 2.5 V 200.mu.A at 4.0 V 300.mu.A at 6.3 V 500.mu.A at 10 V

ESRs of the capacitors were also measured. As a result, the average value thereof was 33 m.orm.

In the above-described preparation procedure, 11.2% of 500 capacitors were rejected from lots for the reason that LCs thereof had increased after the step of forming a resin sheath.

With respect to acceptable products, 1.1% of the 500 products were impaired their functions as cpapacitors after subjected to heat experiment where the products were put through a reflow oven twice and kept at 260.degree.C. for 20 seconds in total.

Comparative Example 2

The same preparation method as in Example 1 was carried out to obtain a solid electrolytic capacitor except that the amount of the PTFE in the soaking step for forming a porous phase was 5% by volume.

With respect to 10 capacitors obtained in this manner and having a capacity of 10 V/100.mu.F, LCs measured at a voltage of 4.0 V and ESRs were also measured. As a result, the average values thereof were 179.mu.A and 33 m.orm., respectively.

Comparative Example 3

The same preparation method as in Example 1 was carried out to obtain a solid electrolytic capacitor except that the amount of the PTFE in the soaking step for forming a porous phase was 30% by volume. The porous phase formed has a prosity of lower than 55%.

With respect to 10 capacitors obtained in this manner and having a capacity of 10 V/100.mu.F, LCs were measured at a voltage of 4.0 V and ESRs were also measured. As a result, the average value thereof were 11.mu.A and 46 m.orm., respectively.

What is claimed is:

1. A solid electrolytic capacitor comprising:
   an anode body wherein an element lead wire is at least partially inserted into the anode body, the anode body comprising a sintered valve metal having a substantial number of voids therein;
   a dielectric layer formed on at least part of a surface of the anode body;
   a semiconductor layer including a porous phase and an electrically conductive polymer, the porous phase disposing on the dielectric layer and extending into the voids, the electrically conductive polymer filling a plurality of through-holes of the porous phase with the electrically conductive polymer; and
   a cathode body formed on a surface of the semiconductor layer.

2. A solid electrolytic capacitor according to claim 1, wherein bond between porous phase constituents includes bond by cross-linking.

3. A solid electrolytic capacitor according to claim 1, wherein bond between the electrically conductive polymer and the porous phase, which the semiconductor layer comprises, includes bond by cross-linking.

4. A solid electrolytic capacitor according to claim 3, wherein bond between the semiconductor layer and the dielectric layer includes bond by cross-linking.

5. A solid electrolytic capacitor according to claim 1, wherein the porous phase has a porosity of about 58% to about 95%, and the pores have an average area of opening of about 0.008 $\mu m^2$ to about 0.008 $mm^2$.

6. A solid electrolytic capacitor according to claim 2, wherein the porous phase has a porosity of about 58% to about 95%, and the pores have an average area of opening of about 0.008 $\mu m^2$ to about 0.008 $mm^2$.

7. A solid electrolytic capacitor according to claim 3, wherein the porous phase has a porosity of about 58% to about 95%, and the pores have an average area of opening of about 0.008 $\mu m^2$ to about 0.008 $mm^2$.

8. A solid electrolytic capacitor according to claim 4, wherein the porous phase has a porosity of about 58% to about 95%, and the pores have an average area of opening of about 0.008 $\mu m^2$ to about 0.008 $mm^2$.

9. A solid electrolytic capacitor according to claim 1, wherein the semiconductor layer has a thickness of about 10 $\mu m$ to about 1 mm.

10. A solid electrolytic capacitor according to claim 2, wherein the semiconductor layer has a thickness of about 10 $\mu m$ about 1 mm.

11. A solid electrolytic capacitor according to claim 3, wherein the semiconductor layer has a thickness of about 10 $\mu m$ to about 1 mm.

12. A solid electrolytic capacitor according to claim 4, wherein the semiconductor layer has a thickness of about 10 $\mu m$ to about 1 mm.

13. A method for preparing a solid electrolytic capacitor comprising steps of:
    (a) providing an anode body with the dielectric layer into which a surface portion of the anode body is converted;
    (b) forming a semiconductor layer comprising a porous phase having through-holes and an electrically conductive polymer by the steps of:
        applying a liquid comprising a substance which will form a porous phase of a semiconductor layer onto a surface of the dielectric layer;
        drying the resultant to form the porous phase having through-holes;
    (c) forming an electrically conductive polymer of the semiconductor layer in such a manner that the through-holes of the porous phase are filled with the electrically conductive polymer, thereby forming the semiconductor layer; and
    (d) forming a cathode body on the surface of the semiconductor layer.

14. A method for preparing a solid electrolytic capacitor according to claim 13, said method further comprising, between the step (b) and the step (c), a step of:
    forming a layer containing a cross-linking agent on a surface of the dielectric layer and on a surface of the porous phase.

15. A method for preparing a solid electrolytic capacitor according to claim 14, wherein the porous phase contains an inorganic oxide, and the cross-linking substance contains a silane coupling agent.

16. A method for preparing a solid electrolytic capacitor according to claim 13, wherein in the liquid which is applied to the dielectric layer, the concentration of the substance for forming the porous phase is in a range of about 10% by volume to about 20% by volume based on the volume of the liquid.

* * * * *